March 16, 1926.  
P. C. JOUAN  
1,576,914  
BALANCE  
Filed Feb. 2, 1924  
4 Sheets-Sheet 1
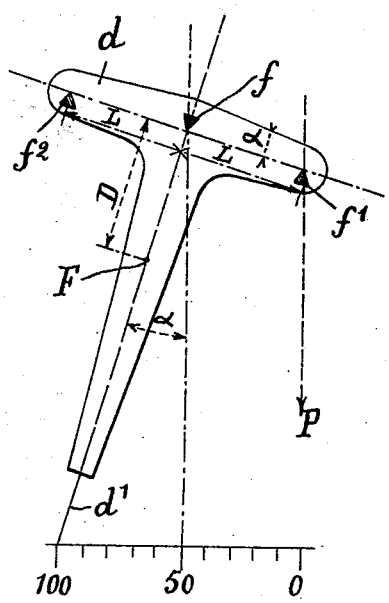
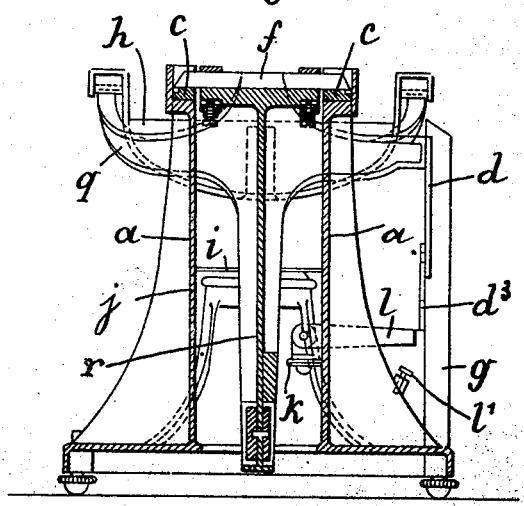
Inventor  
Pierre Constant Jouan March 16, 1926.                                                1,576,914
P. C. JOUAN
BALANCE
Filed Feb. 2, 1924                              4 Sheets-Sheet 2

Inventor
Pierre Constant Jouan
By [signature]
att.

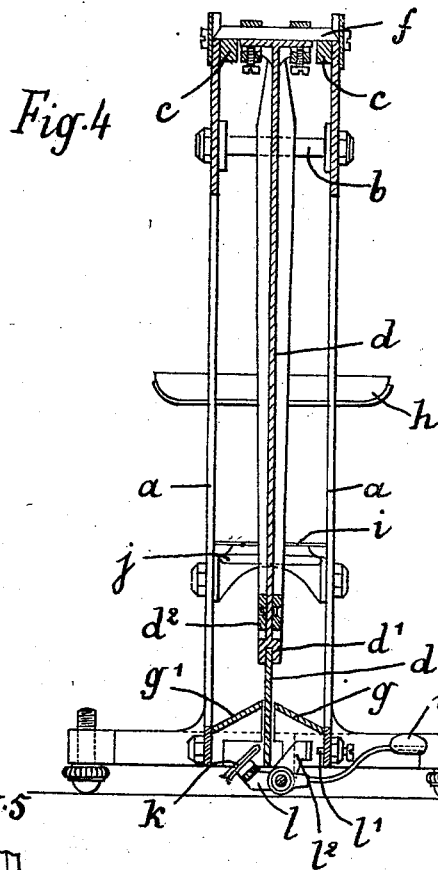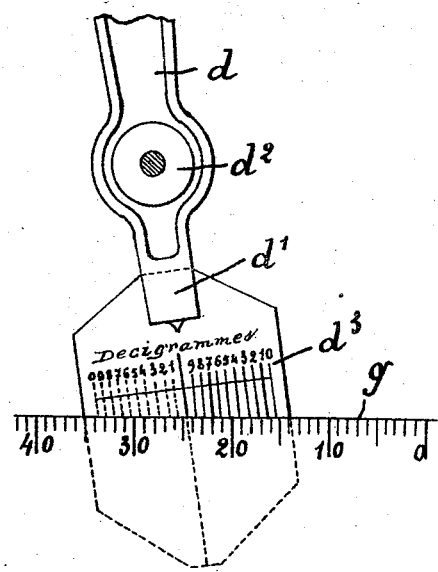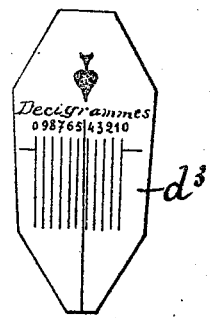

Patented Mar. 16, 1926.

1,576,914

UNITED STATES PATENT OFFICE.

PIERRE CONSTANT JOUAN, OF PARIS, FRANCE.

BALANCE.

Application filed February 2, 1924. Serial No. 690,157.

*To all whom it may concern:*

Be it known that I, PIERRE CONSTANT JOUAN, engineer, citizen of the Republic of France, residing in Paris, France, and whose post-office address is 45 Rue de la Quintinie, have invented certain new and useful Improvements in or Relating to Balances; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The weighing of an article by means of a number of small weights which are passed from one scale of the balance to the other is, as is well known, a long and wearisome operation. When the condition of equilibrium has been attained in a certain position of the balance, it is necessary to add up and subtract the weights. The reason why this manner of weighing is still used is the fact that the automatic balances, for instance, the lever balance, can be used only for ascertaining weights lying within very narrow or close limits. As regards the lever balance, it is known that the angle which the lever assumes under the influence of a load is not a direct function of the load. In other words, if the weight is indicated as for instance in the ordinary letter balances by means of divisions arranged upon a graduated sector, the divisions are not equidistant for even weights. It is also known that the divisions would be equidistant if instead of being arranged circumferentially they were arranged upon a straight line tangent to the circumference at the point corresponding to the horizontal position of the line passing through the knife points.

It will be clear from the foregoing that if one could embody in the same weighing apparatus the advantages of the well known scale balance and those of a lever balance, one would produce an apparatus in which the features of the lever balance could be utilized for measuring fractions of the weight represented by the complete scale and one could at the same time use additional weights each of a value equal to that of the complete scale.

There are known balances in which the lever carries a needle playing along a graduated scale, but the divisions of the scale which are confined within a very small angle have no relation to the corresponding weights and are used in practice only for determining more rapidly the centre of the oscillation or a very small fraction of the weight.

It is also well known that stabilization of the lever and the scale during the weighing operation takes place very slowly and that it is somewhat difficult to overcome this drawback.

In the balance which forms the subject of the present invention, an almost immediate stabilization of the lever and the scales is obtained by very simple means.

The invention will now be more fully explained by reference to the accompanying drawings which illustrate the application of the invention to a balance in which direct reading may be attained up to 100 grammes, with an accuracy to a decigramme.

Fig. 1 is a diagrammatic view of the balance lever in its extreme position which it assumes under a load corresponding to the maximum of the scale, the angle of inclination corresponding to half of the entire scale.

Fig. 4 is a cross section through the axis of the apparatus shown in Fig. 2.

Fig. 5 shows a nonius provided at the lower end of the balance lever.

Figs. 6, 7 and 8 show a modified construction of the balance, and

Fig. 9 represents a modified construction of the nonius.

In order to explain the invention, it will be necessary to refer to some known theoretical consideration. The equation of the moments can be readily made from Fig. 1. If P be the weight chosen to be represented by half the scale E, L the length of each arm of the balance lever, F the weight of the balance lever alone assumed to be applied at its centre of gravity, and D the distance of this centre of gravity from the edge of the suspension knife, then with the system in equilibrium:

$$PL \cos \alpha = FD \sin \alpha$$

or $$PL = FD \, tg. \, \alpha \quad (1)$$

As the values L, F and D are given by the construction of the balance, it will be seen that the tangent of the angle of inclination corresponding to a given weight is proportionate to said weight. The equation (1) may also be:

$$tg.\ \alpha = P\frac{L}{FD} = kP$$

($k$ being a constant). Therefore, if the scale E is perpendicular to the line which connects the edge of the suspension knife to that point of the scale which corresponds to the horizontal position of the other knives, the divisions of the scale will be equidistant for even weights.

Another conclusion which may be drawn from the equation (1) is the following:

If it is desired that a certain weight P should produce an inclination $\alpha$, the balance lever must be so constructed as to satisfy the equation $$FD = \frac{PL}{tg.\ \alpha}.$$

Figure 2:
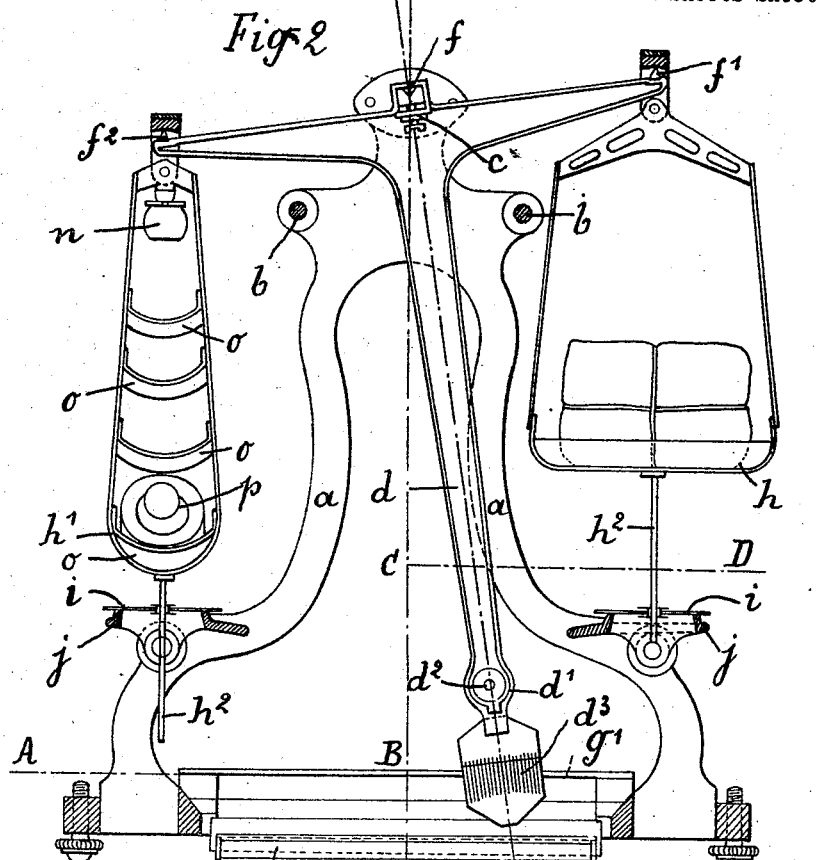
Fig. 2 is an elevation partly in section of the whole balance.
Figure 3:
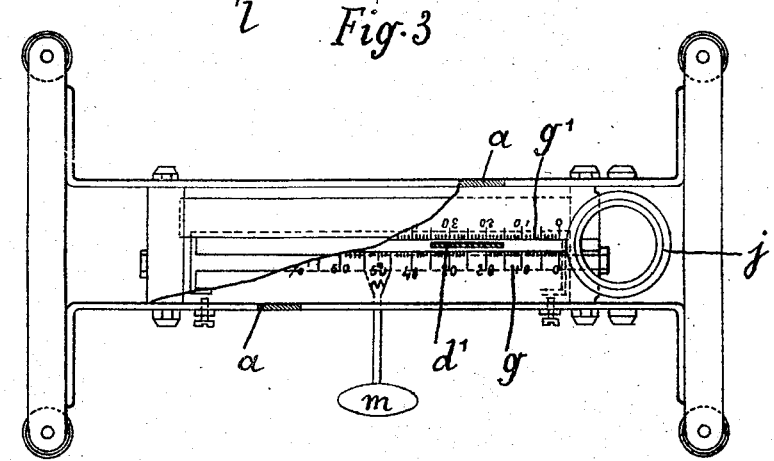
Fig. 3 is a horizontal section on lines A, B, C, D, of the Fig. 2.

This may be attained either by adjusting the centre of gravity of the balance lever or by adjusting its weight. In carrying into effect the present invention care should be taken to reduce as far as possible the weight of the balance lever which may be done by increasing as far as possible the length D. This has the advantage of reducing the inertia of the system and increasing its sensitivity, other factors remaining the same. Bearing in mind the advantages above referred to one constructional form of the invention will now be described with reference to Figs. 2 to 4 of the accompanying drawings.

The frame of the balance is constituted by two cheeks $a$, $a$ which are connected by cross members $b$ and carry at the top supports $c$ of the balance lever. Between the cheeks $a$ is arranged the balance lever $d$ which is of T shape and angle section and carries the main suspension knife $f$ and the two additional knives $f^1$ and $f^2$. The lower end $d^1$ of the vertical part of the balance lever $d$ carries a regulating weight $d^2$ which serves for adjusting the weight of the lever, and a nonius $d^3$ which projects into the base of the apparatus between two rules $g$ and $g^1$ arranged in such a manner as to form rectilineal horizontal scales by means of which the absolute value of the tangent of the angle of inclination of the balance lever and consequently also the weight may be directly read at any time.

The nonius which is separately shown in Fig. 5 contains a strong line extending in the direction of the axis which indicates upon the scale $g$ the weight to be measured in grammes. In addition to the main line the nonius contains other divisions properly drawn and intended to indicate deci-grammes. As may be seen from Fig. 5 the divisions of the nonius are arranged in two groups. The divisions of the right hand group serve for reading fractions of the gramme corresponding to the divisions 0 to 50 of the scale $g$, that is to say, up to the vertical axis passing through the knife $f$ of the balance, whilst the divisions of the other group which may be distinguished by a different colour, serve for reading fractions of the gramme from 50 to 100 grammes. The divisions 50 to 100 of the rule $g$ should be of the same colour as the corresponding divisions of the nonius. It should be noted that the division lines of the nonius should be arranged in such a manner that the secants constituted by the intersection of these divisions and the edge of the scale should have a constant length at any inclination of the balance lever. As a rule, it may be found by calculation that a group of straight lines suitably inclined may be used in place of the mathematically correct curved lines which will with sufficient accuracy answer the above mentioned conditions.

The oscillations of the scales $h$, $h^1$ and the balance lever $d$ should be damped in a suitable manner in order to produce a rapid stabilization of the balance. For this purpose, the two scales carry each at its under side a vertical rod $h^2$ which passes freely through the central opening of a light and freely mounted plate $i$ which rests under its own weight upon the horizontal annular edge of a circular support $j$ fixed to the cheeks $a$. The oscillations of the scales during each weighing operation can take place only with a simultaneous movement of the plates $i$ and are therefore braked in the horizontal direction without in any way impeding the vertical movement and reducing the sensitivity of the balance. The stabilization of the balance lever $d$ in the exact position corresponding to the weight to be measured is effected by means of a brake member $k$ of flexible material, for instance, leather carried by a pivoted lever $l$ and provided with a finger key $m$. By depressing the key $m$ several times in rapid succession a number of instantaneous braking actions of short duration is produced by which the balance lever is arrested in the required position. For adjusting the amount of friction between the brake member $k$ and the balance lever, there is provided a stop $l^1$ which limits the stroke of an arm $l^2$ of the lever $l$.

The upper part of the weight scale $h^1$ is provided with a weight $n$ of a value equal to 50 grammes which causes the balance lever $d$ to assume a position in which the middle line of the nonius is opposite the zero of the scale, that is, the starting point of the scale, when the scale $h$ is free of load.

Upon an object to be weighed being placed upon the scale $h$, the balance lever $d$ oscillates from left to right and is arrested or stabilized by tapping upon the key $m$. As soon as the balance lever is arrested, the weight of the object placed in the scale $h$ may be read directly upon the scale $g$.

The described balances may, however, be utilized for weighing objects of a weight larger than 100 grammes by placing on the scale $h^1$ weights of 100 grammes or multiples of 100 grammes. The scale $g$ then serves only for reading the remainder, that is, fractions of 100 grammes. For this purpose, the scale $h^1$ is provided with inclined shelves $o$ adapted for the reception of weights $p$. It will be observed that all the weights placed in the shelves $o$ will be disposed exactly in the vertical axis of the scale $h^1$.

For weighing weights above 100 grammes, the object to be weighed is again placed in the scale $h$ which causes the balance lever to swing against the corresponding stop. A weight of 100 grammes is then placed upon the other scale $h^1$. If this weight does not produce any effect upon the balance lever, a second weight of 100 grammes is inserted and so on until the scale $h$ is lifted. If the equilibrium is established in such a position that the end $d^1$ of the balance lever remains between the limits of the scale constituted by the rules $g$, $g^1$ (Fig. 3) the operation is completed and the weight may be directly read by reading it on the scale and by counting the weights placed in the scale $h^1$. For instance, assuming that the scale $h^1$ carries weights of 100 grammes and 50 grammes as described and that the end $d^1$ of the balance lever has been stopped at the division 24 and seven-tenths, the weight of the object in the scale $h$ will be 174 grammes and 7 decigrammes.

Figure 6:
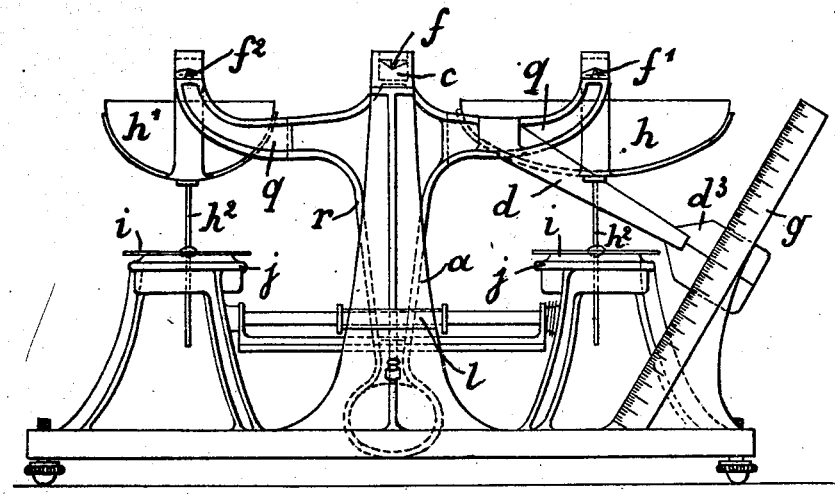
Figure 7:
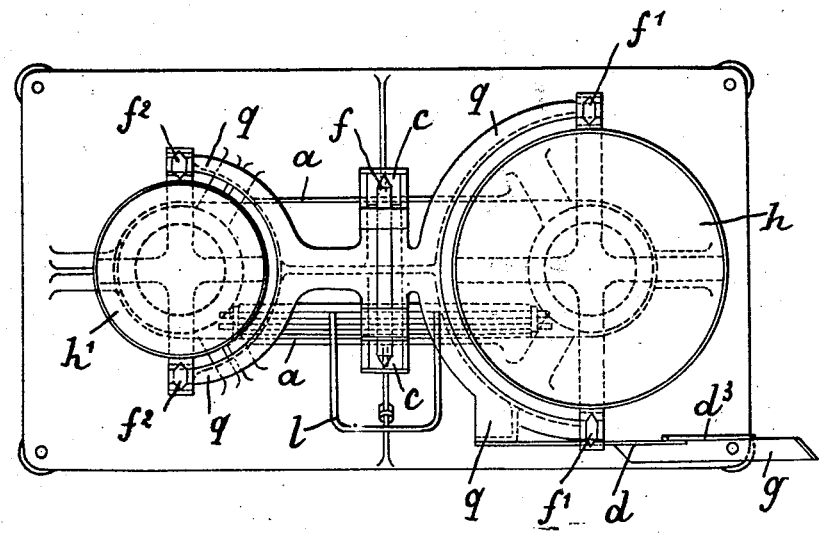

Figs. 6 to 8 represent a modified form of the invention in which the hollow scales or pans are provided with eyes or handles resting directly upon knives mounted upon the arms $q$ of the balance lever $r$. Each pan rests upon two knives $f^1$, $f^1$ or $f^2$, $f^2$, respectively. In this construction the weight is read upon an inclined scale $g$. The reference letters indicating the various parts of the balance are the same as in Figs. 2, 3 and 4. It will be observed that the plates $i$ for braking the scales $h$, $h^1$, and the brake $k$ acting upon the balance lever $r$ act in exactly the same manner as the previously described construction. The shaft of the key handle of the brake is, in this case, provided with a return spring.

In the nonius previously described the divisions of the nonius are arranged in two groups of 1 to 10 arranged on opposite sides of the axis of the nonius each group serving in connection with the corresponding half of the scale. In some cases it is very convenient to use a single nonius which may be employed for the whole length of the scale, as shown in Fig. 9. In this case, the scale of the nonius has only one group of divisions from 0 to 10 arranged in the manner shown.

It will be understood that the described forms of construction are given only by way of example and that the invention is not restricted to these particular forms.

Having now particularly described and ascertained the nature of my said invention and in what manner the same is to be performed, I declare that what my claim is:

1. An improved balance, which comprises a frame, a scale pan to receive the object to be weighed, a weighted balance lever pivoted upon the frame, said frame having a rectilineal graduated scale along which the end of the weighted balance lever travels, said lever having a nonius at its free end, and another scale pan adapted to receive weights corresponding to the maximum of the graduated scale or multiples thereof.

2. An improved balance, which comprises a frame, a scale pan adapted to receive the object to be weighed, a weighted balance lever pivoting upon the frame, said frame having a rectilineal graduated scale along which the end of the weighted balance lever can travel and said scale having equidistant divisions for even weights, said lever having an index mark and a nonius at the free end thereof, and another scale pan adapted to receive weights corresponding to the maximum of the graduated scale or multiples thereof.

3. An improved balance, which comprises a frame, a scale pan to receive the object to be weighed, a weighted balance lever pivoted upon the frame, said frame having a rectilineal graduated scale along which the end of the weighted balance lever can travel, said lever having a nonius at the free end of the same, another scale pan adapted to receive weights corresponding to the maximum of the graduated scale or multiples thereof, vertical members carried by the two scale pans, and freely mounted horizontally-arranged plates through which the said vertical members run freely.

4. An improved balance, which comprises a frame, a scale pan to receive the object to be weighed, a weighted balance lever pivoted upon the frame, said frame having two rectilineal graduated scales between which the end of the weighted balance lever can oscillate thus allowing the reading of the weights corresponding to the inclination of the balance lever to be made from either side of the apparatus, said lever having a nonius at the free end of the same, and another scale pan adapted to receive weights corresponding to the maximum of the graduated scale or multiples thereof.

5. An improved balance, which comprises a frame, a scale pan adapted to receive the object to be weighed, a weighted balance lever pivoted upon the frame, said frame having a rectilineal graduated scale along which the end of the weighted balance lever can reciprocate, said lever having a nonius at its free end, a braking board adapted to act upon the balance lever, a key to actuate said braking board, and another scale pan adapted to receive weights corresponding to the maximum of the graduated scale or multiples thereof.

6. An improved balance, which comprises a frame, a scale pan adapted to receive the object to be weighed, a weighted balance lever pivoted upon the frame, said frame having a rectilineal graduated scale along which the end of the weighted balance lever can reciprocate, said lever having a nonius at its free end constituted by lines traced in such a manner as to make the secants equal for any inclination of the balance lever, and another scale pan adapted to receive weights corresponding to the maximum of the graduated scale or multiples thereof.

In testimony that I claim the foregoing as my invention, I have signed my name.

PIERRE CONSTANT JOUAN.